United States Patent [19]

Bachhofer et al.

[11] Patent Number: 4,652,370

[45] Date of Patent: Mar. 24, 1987

[54] OZONE WATER PURIFYING APPARATUS

[76] Inventors: Bruno Bachhofer, Säntisstrasse 85, D-7981 Bavendorf; Anton Locher, Bergstrasse 6, 7981 Torkenweiler, both of Fed. Rep. of Germany

[21] Appl. No.: 744,481

[22] Filed: Jun. 13, 1985

[30] Foreign Application Priority Data

Jun. 23, 1984 [DE] Fed. Rep. of Germany ....... 3423256

[51] Int. Cl.$^4$ .............................................. C02F 1/78
[52] U.S. Cl. .................................... 210/192; 210/206; 210/209; 210/232; 250/435
[58] Field of Search ............... 210/192, 232, 760, 209, 210/721, 206; 250/428, 435, 438

[56] References Cited

U.S. PATENT DOCUMENTS 4,007,118 2/1977 Ciambrone ......................... 210/760

FOREIGN PATENT DOCUMENTS 656544 1/1965 Belgium .............................. 210/760
2020800 11/1971 Fed. Rep. of Germany ...... 210/192
2511499 9/1976 Fed. Rep. of Germany ...... 210/192
2848178 5/1980 Fed. Rep. of Germany ...... 210/192

*Primary Examiner*—Benoit Castel
*Attorney, Agent, or Firm*—Spencer & Frank

[57] ABSTRACT

An ozone water purifying apparatus consists of a tank (1) and of a treatment unit (3) fastened to the interior of the cover (2) of the tank (1) exhibiting a feed orifice (14) and a return orifice (11) and preferably a filter sand bed (13). With the aim of achieving a more compact mode of construction and to facilitate the access to the lower part of the tank interior, the feed orifice (14) is fitted on the side wall of the tank (1) and connectable to the inlet pipe (7) of the treatment unit (3) by means of a removable intermediate piece (15,16,17). The intermediate piece is a closed pot (15), which is plugged over the feed pipe connection by a horizontal pipe section (16) and is fastened by means of two support arms placed on vertical studs (26).

5 Claims, 5 Drawing Figures

OZONE WATER PURIFYING APPARATUS

BACKGROUND OF THE INVENTION

The invention relates to an ozone water purifying apparatus with the following features: a tank is provided, which exhibits at the top a manhole closable by means of a cover. A treatment unit, which consists of an ozoniser and a mixer, is fastened to the interior of the cover. The treatment unit has an inlet pipe pointing vertically downwards, and lateral outlet orifices. The tank has a feed orifice and a return orifice, and preferably a filter bed.

It is necessary for the interior of the tank of such an apparatus to be accessible from above, particularly if it is simultaneously a filter tank. The filter bed is generally composed of a plurality of layers of different sands or gravels. They rest upon a perforated bottom, also called a nozzle bottom, or else a so-called filter spider is located in a lower coarse-grain layer and collects the filtered water in the lower region, so that it can be withdrawn from the tank via the return orifice. It is necessary for the apparatuses mentioned to be installed in the tank and to be accessible from time to time for inspection or cleaning, in order to exchange the sand charge, for example.

For this reason, in an apparatus of the type initially designed, and disclosed, for example, in German Pat. No. 2,412,770, the treatment unit together with its complete water feed means is fitted on the cover of the tank and can therefore be removed by lifting off the cover. The peculiarity of this known apparatus lies, inter alia, in the very fact that the treatment unit is not fitted outside the tank, but is immersed in the water charge of the tank, which extends virtually to the top. The reason for this is that the ozoniser which forms a part of the treatment unit needs to be cooled, and in this manner dissipates its heat advantageously to the water to be purified. The ozone transport path is also extremely short. More specifically, in the known apparatus the problem of the water feed is solved in that the feed pipe penetrates the cover and is connected permanently to the inlet pipe of the treatment unit by means of a 180° bend. The feed pipe together with the 180° bend is therefore also removed when the cover and the treatment unit are lifted out.

However, the known design ceases to be satisfactory for larger, and larger-capacity, water treatment apparatuses. The considerable hydraulic resistance of the 180° bend becomes a disturbing factor. The feed pipe passage arranged eccentrically on the cover necessitates a larger cover diameter than is necessary for the passage of a fitter, and desirable from the standpoint of standardising the components of such an apparatus. The sealing difficulties increase disproportionally with the diameter of the cover.

The water feed pipe, which is brought in from above and penetrates the cover, also obstructs the arrangement and maintenance of electrical auxiliary units of the treatment unit which are located on the top side of the cover.

SUMMARY OF THE INVENTION

In contrast to the above, it is the object of the invention, whilst retaining the design and fitting of the treatment unit, to permit assembly and inspection work to be performed in the lower region of the tank without having to disconnect or separate the installed water feed pipe outside the tank.

This object is achieved, according to the invention starting from an apparatus of the type initially designated, in that the feed orifice is fitted on the side wall or the cylindrical envelope of the tank and is connected to the inlet pipe of the treatment unit by means of a removable intermediate piece. According to this proposal, therefore, the feed pipe is removed from the cover and is no longer a disturbing factor in this region. On the contrary, it remains permanently connected to the tank side wall. It no longer needs to be disconnected, which is in any case more difficult for larger pipe cross-sections, and water can no longer escape during operation. The diameter of the cover is limited substantially to the external diameter of the ozoniser. With regard to the design details, it is proposed that the intermediate piece is a closed pot which is connected to the tank envelope by means of a horizontal pipe section on one side and by means of at least one support arm on the other side, and the inlet pipe of the treatment unit is pluggable into it from above. The plug-in connection is conveniently provided with a suitable seal element. The bottom edge of the inlet pipe need be only a comparatively short interval from the pot bottom. This has the advantage that the vertical dimension from the pot bottom to the cover is substantially shorter than, for comparison, the vertial dimension from the bottom apex of the 180° pipe bend to the cover in the case of the known apparatus. It is therefore possible to use a lower tank, and the apparatus becomes more compact. Moreover, the radial flow at the bottom end of the inlet pipe produces a particularly homogeneous flow distribution in the inlet pipe, which is advantageous for the functioning of the treatment unit.

To make it possible for the described intermediate piece to be exchanged easily at a touch, it is proposed that two horizontal support arms, which are fitted to the post, each exhibit a vertical bore at its free end, and that vertical studs fastened to the tank envelope engage into the bores. The pot can also be centered quite precisely by this means. The feed orifice of the tank preferably consists of a pipe connection projecting into the interior of the tank and surrounded by a resilient ring. The horizontal pipe section can be plugged over the pipe connection, in which case it comes into abutment with the ring on its end face and compresses the latter. The resilient ring may be a sealing ring, or a spring washer, if another sealing arrangement is provided. The force necessary to compress the ring results simply from the pressing of the support arms into the vertical studs of conical construction.

BRIEF DESCRIPTION OF THE DRAWING

An exemplary embodiment of the invention is explained below with reference to the drawing, wherein specifically.

DESCRIPTION OF THE PREFERRED EMBODIMENTS

Figure 1:
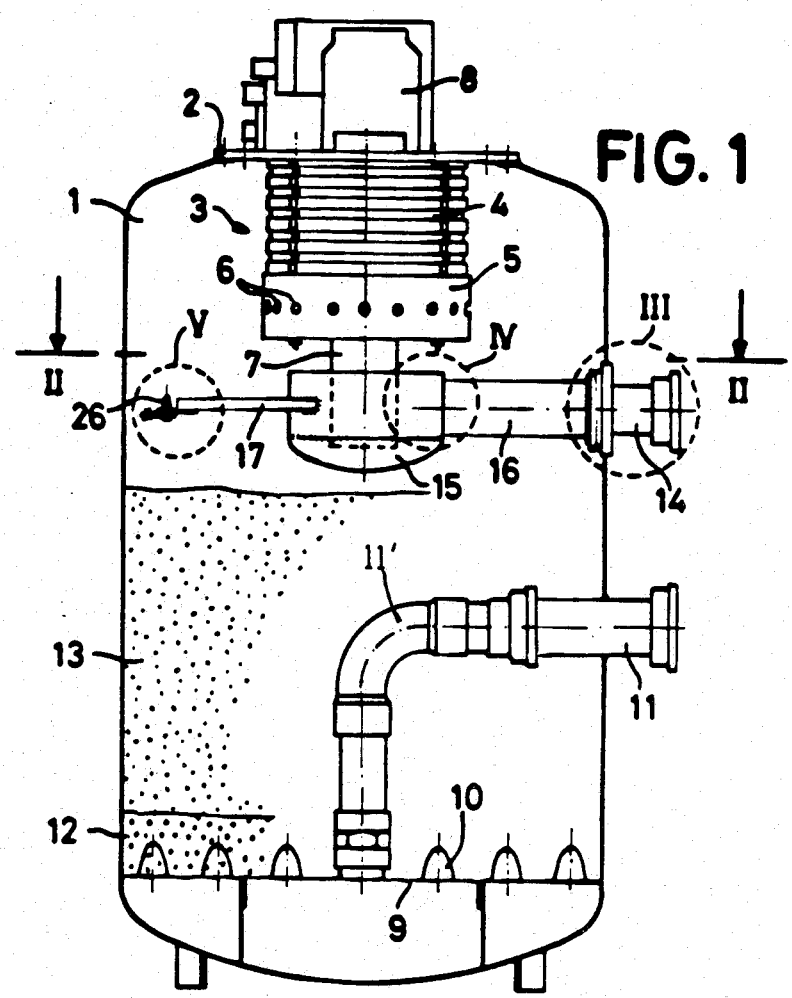
FIG. 1 shows a vertical longitudinal section of a water purifying apparatus with cylindrical tank.
Figure 2:
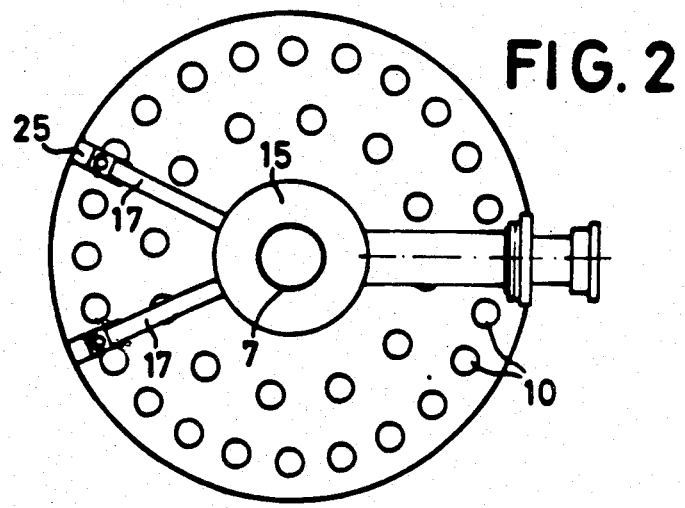
FIG. 2 shows a horizontal cross-section II—II of this apparatus and FIGS. 3 to 5 show vertical sections on a larger scale of the regions designated by broken-line circles III, IV and V in FIG. 1.

The apparatus according to FIGS. 1 and 2 consists of an upright cylindrical tank 1 with a domed bottom and with a cover 2 fastened tightly all round by screws. A treatment unit 3, consisting of an ozoniser 4 and of a mixer pot 5, on which radial outlet orifices 6 are arranged, is suspended from the underside of cover 2. A cylindrical inlet pipe 7 projects downwards from mixer pot 5. It contains an annular injector, in which the inflowing water is brought together with a gas containing ozone. The mixture is then deviated and swirled several times, and then exits through the outlet orifices 6 into the tank 1. A transformer 8 and other auxiliary units of the ozoniser, which are only indicated, are fitted on the cover 2.

A horizontal intermediate plate 9 with strainer nozzles 10 is provided just above the tank bottom. The space beneath intermediate plate 9 is connected by means of a pipe bend 11' to a return pipe connection 11 penetrating the tank envelope. A layer 12 of a coarser so-called supporting sand is placed on the intermediate plate 9, with a layer of filter sand 13 above it.

The water feed pipe, not shown, is connected to a feed pipe connection 14, which is likewise inserted into the tank envelope above the return pipe connection 11. A removable intermediate piece, consisting of a pot 15, a horizontal pipe section 16 and two horizontal support arms 17, establishes the pipe communication between the feed pipe connection 14 and the inlet pipe 7 of the treatment unit.

Figure 3:
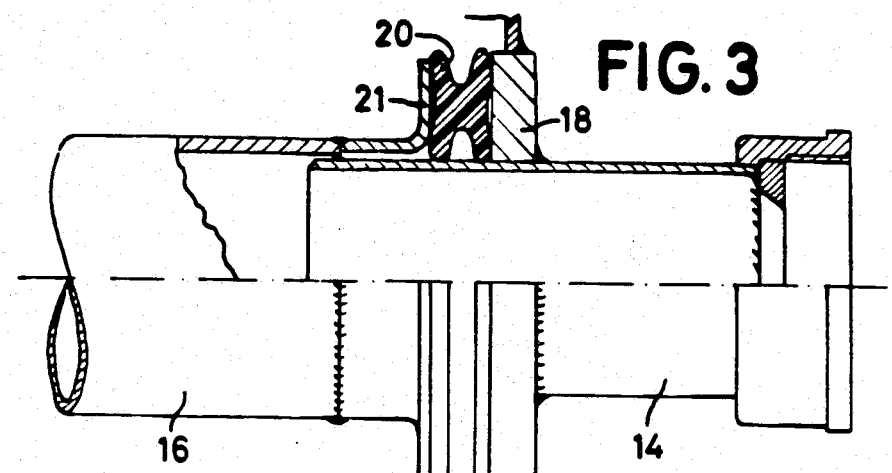

FIG. 3 shows that the feed pipe connection 14 is welded into the wall of the tank 1 by means of an annular flange 18. The pipe section 16 is plugged over the inwardly projecting part of the feed pipe connection 14. A rubber ring 20 is clamped axially between the annular flange 18 and a terminal angle flange 21 of the pipe section 16.

Figure 4:
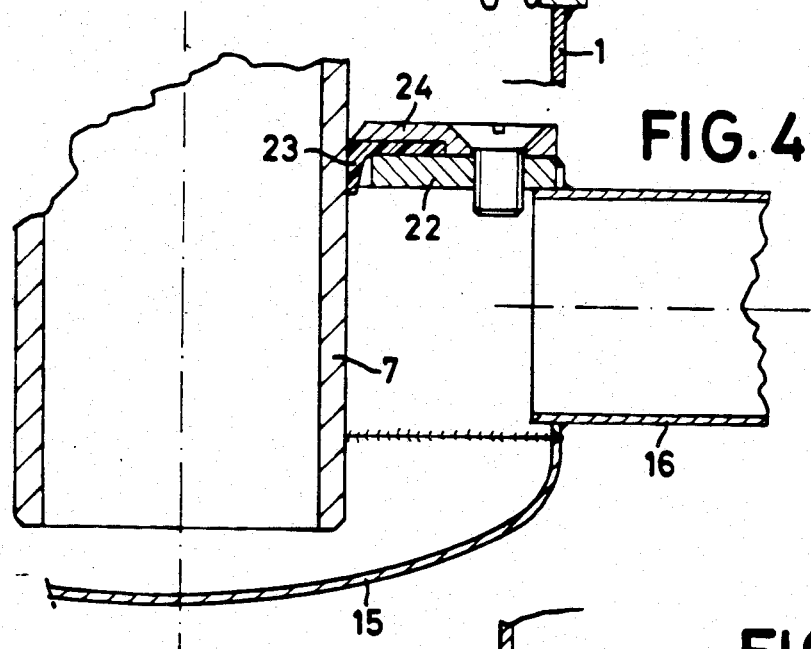

According to FIG. 4, the outlet end of the pipe section 16 is welded to the envelope of the pot 15. The top end 22 of pot 15 has a central orifice, which is surrounded by a lip sealing ring 23. The latter is fastened by means of a clamp ring 24. The inlet pipe 7 of the treatment unit is plugged from above into the orifice and sealed by means of the lip seal ring 23.

Figure 5:
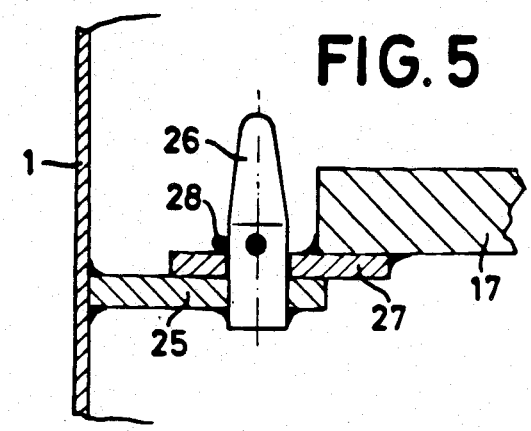

Lastly, FIG. 5 shows the connection of the support arms 17, which are welded to the pot 15, to the wall of the tank 1. Two horizontal tabs 25, which are welded to this wall, exhibit upwardly projecting vertical studs 26 tapered conically at their upper end. Flat irons 27, which are welded to the support arm ends, exhibit bores corresponding to the cylindrical diameter of the vertical studs 26, so that irons 27 pass over studs 26 and rest upon the tabs 25. To prevent the accidental lifting of intermediate piece 15,16,17 when dismantling the treatment unit, the vertical studs 26 have, above the flat irons 27, a transverse bore, into each of which a spring pin 28 is plugged. The spring pin 28 has one straight and one wavy member, the latter of which is positioned round the vertical stud externally.

Starting from the assembled state according to FIG. 1, the following procedure is adopted in the case of an inspection of the filter region: after releasing the fastening screws of the cover 2, the latter is lifted out upwards in common with the treatment unit 3 and with the auxiliary units 8. The inlet pipe 7 then slides out of the pot 15. The spring pins 28 are then withdrawn and the intermediate piece 15,16,17 taken out, by first raising the supports 17 and then pulling off the pipe section 16 from the feed pipe connection 14. The supports 17 are spread only sufficiently to enable the entire intermediate piece to be removed from the tank easily. The lower region of the tank is now accessible. The assembly is performed in inverse sequence. For this the intermediate piece 15,16,17 is inserted as a precise fit by a touch and locked by means of the spring pins 28.

We claim:

1. Apparatus for purifying water with the aid of ozone, said apparatus comprising:
    a tank having a side wall and a manhole at the top of said tank;
    a cover having a bottom surface for closing the manhole with said bottom surface facing downwardly toward the interior of said tank;
    a treatment unit supported from said bottom surface of said cover and comprising an ozone generator, a mixer and a vertical, downwardly projecting inlet pipe for supplying water to be treated to said ozone generator, said inlet pipe having a lower end constituting a water inlet and said treatment unit having lateral outlet orifices for flow of ozonized water out of said treatment unit;
    water feed means fitted to said side wall of said tank for supplying water to be treated to said treatment unit, and treated water outlet means for conducting treated water out of said tank;
    and a removable intermediate structure mounted in said tank and connected between said water feed means and said treatment unit for conducting water to be treated from said water feed means to said inlet pipe of said treatment unit, said intermediate structure being removable from said tank and separable from said water feed means.

2. Apparatus as defined in claim 1 wherein: said intermediate structure comprises a closed pot, a horizontal pipe section connecting said pot to said water feed means, and at least one support arm extending laterally from said pot and spaced horizontally from said horizontal pipe section, said horizontal pipe section and said support arm being supported at said side wall of said tank; said inlet pipe is inserted into said pot from above; and said pot comprises means forming a plug-in connection with said inlet pipe.

3. Apparatus as defined in claim 2 wherein said at least one support arm comprises two support arms each having a free end remote from said pot, each free end being provided with a respective vertical bore, and further comprising support means fastened to said side wall at the interior of said tank and composed of two vertical studs each engaging removably in a respective one of said vertical bores.

4. Apparatus as defined in claim 3 wherein: said water feed means comprises a pipe connection projecting into the interior of said tank, and a resilient ring located within said tank and surrounding said pipe connection; and said horizontal pipe section has an end which is remote from said pot and which surrounds said pipe connection and bears against said ring to form a separable plug-in connection with said pipe connection.

5. Apparatus as defined in claim 1 further comprising a filter bed disposed in said tank.

* * * * *